(No Model.)

C. M. RICHMOND.
ARTIFICIAL TOOTH CROWN.

No. 414,995. Patented Nov. 12, 1889.

Witnesses:
D. W. Gardner
Wm A Pollock

Inventor:
Cassius M. Richmond
By his Attorney
E. V. Dickerson

UNITED STATES PATENT OFFICE.

CASSIUS M. RICHMOND, OF NEW YORK, N. Y., ASSIGNOR TO THE INTERNATIONAL TOOTH CROWN COMPANY, OF SAME PLACE.

ARTIFICIAL TOOTH-CROWN.

SPECIFICATION forming part of Letters Patent No. 414,995, dated November 12, 1889.

Application filed June 27, 1888. Serial No. 278,361. (No model.)

*To all whom it may concern:*

Be it known that I, CASSIUS M. RICHMOND, of the city, county, and State of New York, have invented a new and useful Improvement in Artificial Tooth-Crowns, of which the following is a full, true, and exact description, reference being had to the accompanying drawings.

My invention relates to an improvement by which I can attach an artificial tooth-crown firmly to a natural prepared root without the use of the band and closed cap heretofore patented to me.

My invention relates to a method of applying a tooth analogous to a pivot-tooth to a root and cementing the same about the pivot within the tooth by crystalline cement, while at the same time the spaces between the crown and the root are filled or backed with a water-proof cement, preferably of the kind known as gutta-percha.

My invention will be readily understood from the accompanying drawings, in which—

Figure 1:
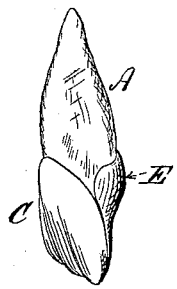
Figure 2:
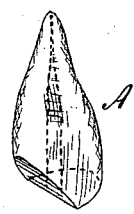
Figure 4:
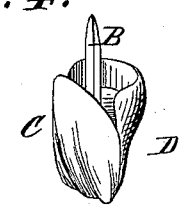
Figure 3:
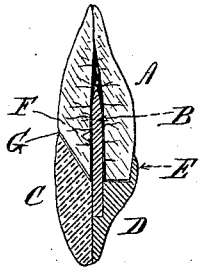

Figure 1 represents the completed operation; Fig. 2, the prepared root; Fig. 3, a vertical section through Fig. 1; Fig. 4, a view of the artificial tooth-crown, and Fig. 5 a view of my invention as applied to bridge-work.

A represents the root. This is prepared by beveling the exterior front side or surface thereof, as clearly shown in Fig. 2, and drilling out the nerve-canal sufficiently for the reception of a pin B. The artificial tooth-crown itself is made with a socket to conform to the prepared end of the root, and it consists generally of the front or artificial porcelain set with its bevel to correspond to the bevel of the root. This porcelain C is backed in the ordinary way by gold solder, so that the pin B is firmly fastened therein. The shape of the backing is shown at D. Its upper part is extended into a half lip or circle E, extending rearward between the side edges of the porcelain C, and which serves the double purpose of protecting the root and preventing its splitting, and also of holding the tooth-crown in position and preventing its rotation or turning upon the root.

Figure 5:
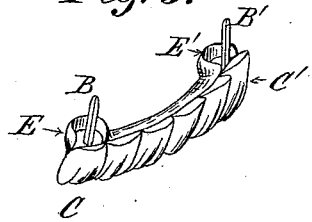

It is obvious that a bridge may be supported upon two of these tooth-crowns, as shown in Fig. 5. The root and artificial denture being suitably prepared, the nerve canal is filled with a retaining-cement, preferably of the kind known as "crystalline cement" F, while the cup itself is filled with a water-proof enduring cement, preferably gutta-percha cement G. When the denture is forced into position, the superfluous cement is squeezed out and an enduring joint is made between the root and the inclosing denture, which prevents the action of the fluids of the mouth upon the otherwise exposed end of the root. It will be observed, likewise, that there being no gold on the exterior surface of the root, the operation is more natural and artistic than the ordinary gold-cap operation heretofore patented to me; and a bevel upon the front of the root enables me to carry my artificial tooth-crown up to the gum-line or beneath it.

What I claim as my invention, and desire to secure by Letters Patent, is—

1. An artificial denture consisting of a tooth having a porcelain front and a metal backing in which the recess or socket for the prepared root is formed partly by the inner beveled face of the porcelain tooth and partly by a curved rim of metal supported by and projecting from the metal backing of the tooth, substantially as set forth.

2. The combination, with a prepared root, of an artificial denture whose exterior portion is of porcelain and is fitted to the front face of the root, and whose rear portion consists of a metallic backing having a projecting lip extending between the edges of the porcelain portion rearward and adapted to the inner or rear face of the root, substantially as set forth.

3. The combination of two prepared roots or artificial dentures which consist of an external porcelain cap having no projecting gold, an internal cap or ring for partially surrounding the root, and an intermediate bridge supporting intermediate dentures, substantially as described.

In testimony whereof I have signed my name to this specification in the presence of two subscribing witnesses.

CASSIUS M. RICHMOND.

Witnesses:
ANTHONY GREF,
WM. A. POLLOCK.